United States Patent Office 3,666,414
Patented May 30, 1972

3,666,414
METHOD OF PRODUCING TRANSPARENT OR OPAQUE FUSED SILICA OR GLASS WITH A HIGH SILICON CONTENT
Otto Bayer, Burscheid, Germany, assignor to Heraeus-Schott Quarzschmelze G.m.b.H., Hanau am Main, Germany
No Drawing. Continuation of abandoned application Ser. No. 721,073, Apr. 12, 1968. This application Mar. 15, 1971, Ser. No. 124,434
Int. Cl. C03c *3/04;* C01b *33/12, 33/16*
U.S. Cl. 106—52
11 Claims

ABSTRACT OF THE DISCLOSURE

Treating the siliceous raw product for the production of transparent or opaque fused silica or of glass with a high silicon content by means of a silicon halide so as to avoid bubbles, shrink holes or the like.

---

This application is a continuation of application Ser. No. 721,073, filed Apr. 12, 1968, and now abandoned.

The present invention relates to a method of producing transparent or opaque fused silica or glass with a high silicon content from a raw product containing $SiO_2$, for example, rock crystal, quartziate, different kinds of sand, precipitated silicic-acid gel, or the like.

It is already known that transparent fused silica may be produced by melting finely ground rock crystal, and opaque fused silica and glass with a high silicon content from different kinds of sand. Many different experiments have also in the past been made in an effort to produce transparent fused silica by melting precipitated silicic-acid gel.

Although it is possible to produce transparent fused silica which is substantially free of bubbles from finely ground rock crystal, such a product still contains certain quantities of water which are combined with it in the form of OH ions and depend upon the particular melting method employed. Due to such a water content, the fused silica has absorption bands within the infrared wave length at 2.72 $\mu$m., 2.22 $\mu$m. and 1.37 $\mu$m.

Aside from water, opaque fused silica which is produced from sand also contains larger quantities of impurities, for example, CaO, $Fe_2O_3$, $TiO_2$, MgO, and $Al_2O_3$.

The efforts which were made in the past to produce bubble-free transparent fused silica from precipitated silicic-acid gels were not successful because residual water is so firmly combined with these gels that it cannot be removed even by heating them thoroughly. The fused silica which was then attained always contained small and larger bubbles, shrink holes, and the like.

It is also known to convert silicon halides, and especially silicon tetrachloride, into $SiO_2$ by hydrolysis or oxidation and then to precipitate this $SiO_2$ raw product as a vitreous mass on a heated carrier. This method is, however, very expensive and technically difficult because of the formation of hydrochloric acid or chlorine, and it can be carried out only when observing special safety provisions.

It is an object of the present invention to improve the raw products containing $SiO_2$ for the production of transparent or opaque fused silica or glass with a high silicon content in such a manner that the above-mentioned disadvantages of the products as previously attained will be at least considerably reduced or eliminated entirely.

According to the present invention it has been discovered that the raw product containing $SiO_2$, such as rock crystal, quartzite, different kinds of sand, precipitated silicic-acid gel or the like, may be considerably improved for producing transparent or opaque fused silica or glass, with a high silicon content by treating this raw product with a silicon halide such as silicon tetrachloride ($SiCl_4$) or silicon chloroform ($SiHCl_3$). This treatment is preferably carried out at an elevated temperature, and thereafter the raw product which has been treated with a silicon halide is heated at a temperature within the range of approximately 1000° C. to 1500° C. before being melted.

The treatment of the siliceous raw products in accordance with the invention with silicon tetrachloride has primarily the advantage that this raw product will be desiccated so that in all cases in which prior to this invention the water content of the raw product was the essential cause of bubbles in the final product, the final product which is now attained is entirely or at least substantially free of bubbles. In such cases in which a substantially bubble-free product may already be attained without resorting to a special pretreatment of the siliceous raw product, the treatment of the raw product with silicon tetrachloride in accordance with the invention has the advantage that the water content of the raw product will be considerably reduced so that the end product will have a very low water content or be even entirely free of water. The transparent fused silica or the highly siliceous glass which is produced from a siliceous raw product which has been treated in accordance with the invention has the additional advantage that it does not possess any undesirable OH-absorption bands within the infrared wave length range at 2.72 $\mu$m., 2.22 $\mu$m. and 1.37 $\mu$m. or that at least the height of these bands is considerably reduced.

Unexpectedly it has further been found that the so-called precipitated silicic acids which may be produced at a low expense may now be melted so as to produce clear transparent glass if the silicic acid which has already been highly desiccated is treated in accordance with the invention with silicon tetrachloride at an elevated temperature and is thereafter, before being melted, heated to a temperature between 1000° C. and 1500° C., and preferably to approximately 1300° C. The vitreous silicic acid which is thus attained does not possess the undesirable absorption bands within the range of the infrared wave lengths as previously mentioned.

The method according to the invention may be carried out in many different manners. If silicic acids are employed, they may be produced according to any conventional method from alkali silicates by precipitation by means of acids and may preferably be specially purified by repeated re-precipitation. The silicic acids which are produced by a wet process are at first subjected to a preliminary drying process at a temperature of about 200° to 400° C. and are thereafter treated in the liquid or solid phase or in the fluidized phase by means of a silicon halide. The preliminary drying process may also be followed by a suitable azeotropic desiccation. The method according to the invention is, of course, suitable not only for the production of silicic acid of the purest, anhydrous, vitreous consistency, but also for the production of different kinds of glass with a high content of silicic acid which also contain certain additions, for example, of oxides of alkali, alkaline earth, zirconium, titanium, or aluminum either individually or in a certain combination of several of these oxides. For carrying out this method, it is also possible to employ gases such as nitrogen or oxygen or suitable diluents, for example, carbon tetrachloride or dichlorobenzene.

If the treatment according to the invention is applied to rock crystal, it is advisable first to grind this to a very fine powder which is then preferably highly predried and thereafter treated in accordance with the invention with silicon tetrachloride which may be either in a liquid or vaporous phase. Very advantageous results will also be attained if the treatment with silicon tetrachloride is carried out in a fluidizing apparatus.

The invention will now be further described in detail in the following example in which the raw product employed consists of precipitated silicic acid:

At first, a silicic-acid gel which is produced by precipitation is strongly predried at a temperature considerably above the boiling point of water, for example, at 200 to 400° C. Thereafter, the silicic-acid gel is mixed with silicon tetrachloride and heated under reflux for about five hours to the boiling point. During this treatment HCl escapes. The remaining silicon tetrachloride is then distilled off and the residue is dried under a vacuum at about 250° C. The material thus attained is then preheated at a temperature of about 1000° C. and thereafter melted at a temperature of about 1800° C.

If the method according to the invention is to be employed for producing glass with a high content of silicic acid, one or more suitable additions, for example, oxides of alkali, alkaline earth, zirconium, titanium, or aluminum are added during the mixing stage.

Although my invention has been illustrated and described with reference to the preferred embodiments thereof, I wish to have it understood that it is in no way limited to the details of such embodiments but is capable of numerous modifications within the scope of the appended claims.

Having thus fully disclosed my invention, what I claim is:

1. A method for producing transparent or opaque fused silica or glass having a high silicon content and of reduced bubble and hydroxyl ion content, from a raw product containing $SiO_2$ such as rock crystal, quartzite, sand, and silicic acid, which comprises:
   (a) contacting the raw product with silicon tetrachloride ($SiCl_4$) or silicon chloroform in vapor or liquid phase for a time sufficient for desiccation thereof,
   (b) removing evolved HCl formed in step (a) and removing any remaining silicon tetrachloride or silicon chloroform.
   (c) preheating the purified siliceous material at a temperature between 1000 and 1500° C., and thereafter heating to a temperature at which said siliceous material melts.

2. A method as defined in claim 1, wherein said contacting is carried out at an elevated temperature.

3. A method as defined in claim 1, wherein said contacting is with silicon tetrachloride in a liquid phase.

4. A method as defined in claim 1, wherein said contacting is with silicon tetrachloride in a vaporous phase.

5. A method as defined in claim 1, wherein said contacting is with silicon chloroform in a liquid phase.

6. A method as defined in claim 1, wherein said contacting is with silicon chloroform in a vaporous phase.

7. A method as defined in claim 1, wherein said contacting is with silicon tetrachloride and said treatment is carried out under fluidizing conditions.

8. A method as defined in claim 1, wherein said contacting is with silicon tetrachloride, and wherein before said contacting said raw product is subjected to a preliminary drying process.

9. A method as defined in claim 1, for producing vitreous silica or glass having a high content of vitreous silica, wherein said raw product consists essentially of precipitated silicic acid and said contacting is with silicon tetrachlorde.

10. A method as defined in claim 9, further comprising the steps of purifying said precipitated silicic acid by reprecipitation and thereafter drying the same.

11. A method as defined in claim 9, wherein the silicic acid treated is mixed with one or more oxides of alkali metals, alkaline earth metals, zirconium, titanium, or aluminum for the production of different kinds of glasses.

References Cited

UNITED STATES PATENTS

| | | | |
|---|---|---|---|
| 2,070,161 | 2/1937 | Flinn | 23—182 R X |
| 2,233,155 | 2/1941 | Adams | 23—182 P |
| 2,911,286 | 11/1959 | Potter | 23—182 P |
| 3,050,364 | 8/1962 | Segrove | 23—182 R |

FOREIGN PATENTS

| | | | |
|---|---|---|---|
| 518,640 | 11/1955 | Canada | 23—182 P |
| 655,272 | 1/1963 | Canada | 106—52 |
| 834,383 | 5/1960 | Great Britain | 23—182 V |
| 1,098,931 | 2/1961 | Germany | 23—182 P |

EDWARD STERN, Primary Examiner

U.S. Cl. X.R.

23—182 R, 182 V, 182 P

UNITED STATES PATENT OFFICE
CERTIFICATE OF CORRECTION

Patent No. 3,666,414            Dated May 30, 1972

Inventor(s) Otto Bayer

It is certified that error appears in the above-identified patent and that said Letters Patent are hereby corrected as shown below:

Col. 1, line 10, add --Claims priority application Germany, April 27, 1967, H 62 565.--

Signed and sealed this 26th day of December 1972.

(SEAL)
Attest:

EDWARD M. FLETCHER, JR.            ROBERT GOTTSCHALK
Attesting Officer                    Commissioner of Patents